(12) United States Patent
Dods

(10) Patent No.: US 7,193,517 B2
(45) Date of Patent: Mar. 20, 2007

(54) LABEL APPLICATOR SYSTEM

(75) Inventor: Steven M. Dods, Edwardsville, IL (US)

(73) Assignee: Illinois Tool Works Inc., Glenview, IL (US)

( * ) Notice: Subject to any disclaimer, the term of this patent is extended or adjusted under 35 U.S.C. 154(b) by 260 days.

(21) Appl. No.: 10/961,420

(22) Filed: Oct. 8, 2004

(65) Prior Publication Data

US 2006/0082446 A1 Apr. 20, 2006

(51) Int. Cl.
*G08B 13/14* (2006.01)
*B29C 65/00* (2006.01)

(52) U.S. Cl. ............................ 340/572.1; 340/572.7; 156/378

(58) Field of Classification Search ........ 347/111–170, 347/2–20, 199, 211, 212; 340/10.4, 10.52, 340/572.1, 572.9; 156/66
See application file for complete search history.

(56) References Cited

U.S. PATENT DOCUMENTS

| | | | | |
|---|---|---|---|---|
| 5,526,563 | A | * | 6/1996 | Tamaki et al. ................. 29/830 |
| 5,897,741 | A | | 4/1999 | Mills et al. |
| 6,130,613 | A | * | 10/2000 | Eberhardt et al. ........ 340/572.7 |
| 6,246,326 | B1 | * | 6/2001 | Wiklof et al. ............ 340/572.1 |
| 6,557,758 | B1 | * | 5/2003 | Monico ....................... 235/380 |
| 7,037,009 | B2 | * | 5/2006 | Barrus et al. .................. 400/76 |
| 2003/0035015 | A1 | * | 2/2003 | Conwell et al. ................ 347/8 |
| 2003/0063139 | A1 | * | 4/2003 | Hohberger et al. ............. 347/2 |
| 2003/0189490 | A1 | | 10/2003 | Hogerton et al. |
| 2005/0115680 | A1 | * | 6/2005 | Thoms et al. ................ 156/354 |
| 2005/0167024 | A1 | | 8/2005 | Sanzone et al. |
| 2006/0028319 | A1 | * | 2/2006 | Kean et al. ............... 340/10.51 |

FOREIGN PATENT DOCUMENTS

| | | |
|---|---|---|
| EP | 0763471 | 3/1997 |
| EP | 0996084 | 4/2000 |
| EP | 1422068 | 5/2004 |

OTHER PUBLICATIONS

EP Search Report for PCT/IB2005/052663 dated Nov. 29, 2005.

* cited by examiner

*Primary Examiner*—Daniel Wu
*Assistant Examiner*—Jennifer Mehmood
(74) *Attorney, Agent, or Firm*—Mark W. Croll, Esq.; Donald J. Breh, Esq.; Levenfeld Pearlstein, LLC

(57) ABSTRACT

A label printer applicator system programs labels having integrated circuits therein and applies the labels to a package. The applicator includes a tamp assembly having a tamp pad movement assembly and a tamp pad coupled thereto. An RF assembly, including an RF antenna, an RFID engine and antenna cable, is coupled to the tamp assembly. The tamp pad moves from a receiving position, where it receives a non-programmed label, to an extended position, where it applies the label to a package. The RFID engine provides RFID information to the RF antenna, which sends RFID information signals to the label to program the label. After the RFID label is applied to the package, the RF assembly sends test signals to the RFID label to determine whether the label has been properly programmed.

18 Claims, 5 Drawing Sheets

LABEL APPLICATOR SYSTEM

BACKGROUND OF THE INVENTION

The present invention relates to a label printer applicator system. More particularly, the present invention pertains to a label printer applicator system that is capable of applying Radio Frequency Identification (RFID) labels to objects.

Automated label printer applicators or label machines are well known in the art. Such a machine prints labels on a continuous web of label material (which web material includes a carrier or liner and a series of discrete labels adhered to the liner at intervals along the liner), feeds the web, removes the labels from the liner and applies the labels to the objects. Although the applicators may be used in a variety of contexts, they are commonly used to apply labels to packages or products that are shipped from a manufacturer, wholesale entity or distributor to a retailer or other customer.

Known label machines include, generally, a supply roll on which the web is wound. The web is fed from the supply roll around a plurality of rollers and enters a print engine. In the print engine, indicia are printed on to the individual labels by a print head according to information sent directly to the print engine CPU from an information source, typically a user computer. The web exits the print engine, and the labels are separated from the liner and are urged into contact with a tamp pad.

The tamp pad is, typically, a vacuum assisted assembly that holds the individual labels and moves the labels into contact with the objects onto which they are adhered. The tamp pads are configured such that a label is transferred onto the pad after it is separated from the liner with the non-adhesive side of the label contacting an impact plate (on the front side of the pad). The label is held on the plate, and the tamp pad is extended toward the object surface for application of the label. In a typical arrangement, a vacuum is used to secure the label to the impact plate. Typical impact pads are formed from a low friction material having a plurality of vacuum openings formed therein. Vacuum channels are formed in the rear of the plate.

The impact plate is mounted to a mounting plate (the rear of the tamp pad) through which a vacuum port provides communication from a vacuum source to the rear of the impact plate. A vacuum is drawn through the vacuum openings to secure the label to the impact plate after separation from the liner and prior to application to the object surface.

Subsequent to separating the labels from the liner, the liner is accumulated onto a rewind or take-up roll for subsequent disposal. The driving force for moving the web through the label machine is provided by a motor that drives the supply roll while the driving force for collecting the liner is provided by a motor that drives the take-up roll.

Labeling machines are generally part of a high-speed overall processing system that must apply labels to objects of varying height. As such, it is desirable to be able to detect various conditions of the supply roll, such as a low label level, few labels remaining or a no labels remaining level, and to detect the height levels of the object to facilitate proper label application on the object.

Standard labels include information printed thereon, such as bar codes, text and graphics. The bar codes store tracking information which can be read with a bar code reader, and the texts and graphics allow individuals to determine what is within the package. The problem with printed information is that only a limited amount of information can be printed on standard sized labels. Further, when a large order is shipped to a customer, the customer must scan each and every package in the order with a bar code reader to read the tracking information stored thereon. Scanning each object is not only time consuming, but inevitably leads to human errors.

As a result, many entities are transitioning to Radio Frequency Identification (RFID) labels, which include a miniature integrated circuit (IC) positioned within a small package or carrier. The RFID labels vary in size and, instead of information being printed on the label, the IC is encoded or programmed with pertinent information. Because the information is stored in the circuit, it is envisioned that large quantities of information will be storable within the IC as RFID technology improves. The larger quantity of information may be accessed via an RFID reader. Further, RFID labels may store information about an entire order, allowing customers to scan only one RFID label to discern pertinent information about the entire order.

Because RFID technology is in a nascent stage, many customers insist that bar code information is printed on the RFID labels to hedge against RFID reading errors. Customers also desire text and graphical information to be printed on the label so that customer employees can discern what is inside the packaging without resorting to an RFID reader.

Thus, in order to use the RFID tags as labels on packages, manufacturers must discern how to print on the RFID labels, program the ICs within the labels, apply the labels to the packages, and ensure that the labels are programmed properly. Typically, the RFID labels are programmed by the use of an RF engine communicating through an RF antenna. The RF antenna receives RFID programming information from the RF engine and programs the IC within the label by sending RFID information signals to the RFID label.

Legacy RFID label application systems position the RF antenna inside the print engine and, while the printer head within the engine prints onto the label, the RF antenna sends signals to the IC in an attempt to program it. These systems have many shortcomings. Most print engines used in label application systems use thermal technology, which requires printer heads comprised of metallic material to facilitate extended printer head life span and accurate printing. The metallic printer head, however, acts as a shield, degrading the signals transmitted by the RF antenna. Consequently, degraded signals reach the IC, resulting in many improperly programmed and malfunctioning RFID labels.

In an attempt to address this problem, legacy systems have moved the RF antenna to distant locations from the signal blocking, metallic printer heads; but, even when positioned at distal locations, the RF antenna's signals are still degraded by the metallic printer head. Other application systems attempted to obviate the problem by searching for printing assemblies that were free of metallic printer heads, but such assemblies included laser jet and ink jet printers, which printed too slow to meet the demands of the high-speed application process.

Having failed to use alternate printing applications, others attempted to increase the signal strength of the RF antennas. But, this too caused problems. The increased signal strength often caused the RF antenna to send signals that would propagate to an adjacent RFID label, resulting in not only the intended RF label being improperly programmed, but also in the adjacent label being improperly programmed.

Further, the printing operation is a fast one, and the RFID labels are moving at a rapid rate, allowing for only a short programming time. The short programming time and rapid label movement result in improperly programmed RFID labels because the RFID labels are best programmed when they are relatively stationary for a minimum amount of time.

In addition, present applicator systems are costly. Most systems include the RF antenna, wiring to the RFID engine and the RFID engine that are hard wired into the print engine, requiring manufacturers to discard their existing print engines and to purchase a new print engine that is capable of applying RFID labels. To reduce costs, there have been RF compliant kits that are mounted into existing print engines. These also have problems. In addition to the signal degradation problems caused by the metallic printer head and the reduced amount of programming time caused by the high speed printing operation, the mount on RF assemblies require two serial communication links.

There is already one serial communication link directly connecting the information source to the print engine, but when the RF mounting assembly is added, an additional serial communication link is required to connect the RFID engine to the information source. Further, additional software and firmware is required at the information source to format information into RFID format. The additional serial link then sends formatted RFIBD information to the RF engine of the RF mounting assembly.

Moreover, in both integral and mount-on legacy RF assemblies, a separate verification device is needed. The verification device is a separate RF antenna that is positioned down stream from the printer head and tamp assemblies. The RF antenna of the verification device sends signals down to the RF labels that have been adhered to the objects to confirm that the adhered labels have been properly programmed. The separate device is an extra component, which not only adds costs, but increases the likelihood of errors.

Accordingly, there exists a need for an improved label printer applicator that prints onto an RFID label, properly programs the IC of the RFID label, applies the label to the package and verifies that the label has been programmed properly. Desirably, existing applicator systems can be upgraded to effectively print onto, program, apply and verify proper programming of RFID labels.

BRIEF SUMMARY OF THE INVENTION

The present invention pertains to an improved print label applicator assembly, and in particular, to one that can print, program, apply and verify proper programming of RFID labels. The applicator assembly includes an RF assembly, which includes an RF antenna, an RFID engine and an antenna cable, coupled to a tamp assembly. In other embodiments, the applicator machine also includes a print engine. In one embodiment, the tamp assembly includes a tamp pad comprised of a non-metallic material, and the RF antenna is coupled to the tamp pad—thus obviating the signal degradation problems caused by metallic printer heads that legacy machines are encumbered by. Further, the tamp pad application process is a relatively slow one, providing the RF antenna additional time to program the RFID label; Enhanced RFID programming accuracy results.

In a preferred embodiment, the print engine includes a printer head, which is formed from metal and is adjacent to the tamp assembly. As a result, the RF antenna may send increased strength signals to the RFID labels with a diminished risk of mis-programming adjacent labels because the metallic printer head blocks the signals from propagating to adjacent labels. The increased signal strength fosters enhanced programming accuracy.

In another preferred embodiment, the RF antenna is a directional one, configured to send signals toward the RFID labels, which, in one embodiment, is downward and planar to the tamp pad. Thus, because the tamp assembly process is a relatively slow one and the RF antenna sends downward signals, preferably with increased signal strength, improved RFID programming results.

Further, after the tamp pad has applied the RFID label and is moving away from the package, the same RF antenna coupled to the tamp assembly is used to send test signals to the RFID label. As a result, the same RF assembly coupled to the tamp assembly serves as the verification device, obviating the need for additional, costly and error prone verification devices that are positioned down stream in legacy assemblies.

According to other embodiments of the invention, applicator machines that are not configured to apply RFID labels can be modified to do so. Those applicator machines that incorporate a controller that is coupled to the information source can be upgraded without the need for additional parts or serial links. Specifically, the controller is upgraded to format information received from the information source into an RFID format, and the RF assembly is coupled to the tamp assembly. The RFID engine of the RF assembly receives information in an RFID format from the upgraded controller and sends the information to the RF antenna, which transmits RFID information signals to the label to program the label. Because the controller is already coupled to the information source and can format information in an RFID format, additional serial links connecting the information source to the RFID engine are not necessary.

These and other features and advantages of the present invention will be apparent from the following detailed description, in conjunction with the appended claims.

BRIEF DESCRIPTION OF THE SEVERAL VIEWS OF THE DRAWINGS

The benefits and advantages of the present invention will become more readily apparent to those of ordinary skill in the relevant art after reviewing the following detailed description and accompanying drawings, wherein.

DETAILED DESCRIPTION OF THE INVENTION

Figure 1:
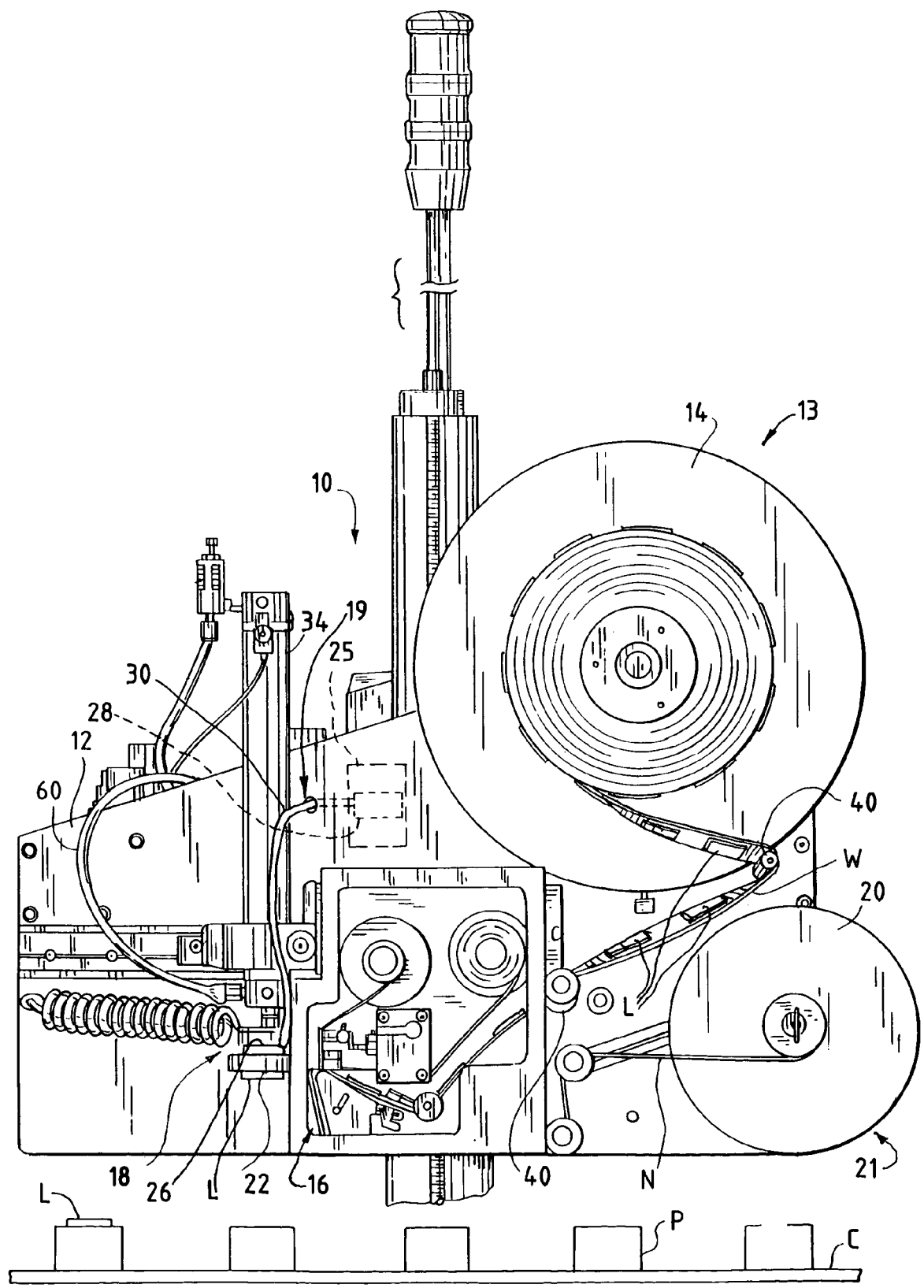
FIG. 1 is a front view of a label printer applicator embodying the principles of the present invention.

While the present invention is susceptible of embodiment in various forms, there is shown in the drawings and will hereinafter be described a presently preferred embodiment with the understanding that the present disclosure is to be considered an exemplification of the invention and is not intended to limit the invention to the specific embodiment illustrated.

It should be further understood that the title of this section of this specification, namely, "Detailed Description Of The Invention", relates to a requirement of the United States Patent Office, and does not imply, nor should be inferred to limit the subject matter disclosed herein.

The present invention pertains to an improved print label applicator assembly, and in particular, to one that can print, program, and verify proper programming of RFID labels. The applicator assembly includes an RF assembly, which includes an RF antenna, a RFID engine and antenna cable, coupled to a tamp assembly. In some embodiments, the applicator machine also includes a print engine. In a preferred embodiment, the tamp pad is comprised of a non-metallic material and the RF antenna is mounted to the tamp pad. Because the tamp operation is slower and the tamp pad is non-metallic, low programming times and signal degradation problems encumbering legacy applicator systems are obviated.

Further, the same RF antenna coupled to the tamp assembly is used to send test signals to the RFID label while the tamp pad is retracting from the package and the package is moving down the conveyer belt. As a result, the same RF assembly coupled to the tamp assembly serves as the verification device, obviating the need for additional, costly and error prone verification devices that are positioned down stream in legacy assemblies. Other embodiments described below facilitate adding an RF assembly to existing applicator machines that are not configured to apply RFID labels. Thus, pursuant to embodiments of the invention, existing applicator assemblies may be upgraded to apply RFID labels without the expense of and labor associated with replacing entire parts or requiring additional communication links from the information source.

Referring now to the figures and, in particular, to FIG. 1, there is shown generally an embodiment of the automatic label printer applicator 10 of the invention that is configured to apply RFID labels to packages. The applicator 10 includes a frame or stand 12 and is positioned above packages P onto which labels L, including RFID labels, are applied. In the embodiment of FIG. 1, the frame 12 has mounted thereto a feeding assembly 13 comprised of a supply or unwind roll 14, a print engine 16, a tamp pad assembly 18 with an RF assembly 19 coupled thereto, and a rewinding assembly 21 having of a take-up or rewind roll 20. Such an applicator 10 is disclosed in Dods, U.S. patent application Ser. No. 10/213,654 (published application, publication No. 20030221784), which publication (and application) is commonly assigned with the present application and is incorporated herein by reference.

A web indicated generally at W (which includes a backing or liner strip N on which discrete RFID labels L are adhered) is fed from the supply roll 14 and traverses through the print engine 16, in which indicia are printed on the individual RFID labels L. The labels L are then separated from the web W and are dispensed to a tamp pad 22. The RF assembly 19, which comprises of an RF antenna 26, an RFID engine 28 and an antenna cable 30, programs the RFID label L after the label is transferred to the tamp pad 22. The RFID label L is programmed with information that a user desires the label L to be encoded with (described in greater detail below). The tamp pad 22 extends to apply the label L to the surface of the package P. As the package P moves away from the tamp pad 22, the RF antenna 26 sends test signals to the RFID label L to confirm proper programming.

The liner N, after the labels L have been removed, is then wound by the rewinding assembly 21 onto the take-up or rewind roll 20. The machine 10 preferably includes one or more sensor assemblies to detect the "level" of labels remaining on the supply roll and to detect the height of the package to ensure that the machine does not run out of labels and that the tamp pad moves in the appropriate direction and distance to apply the label to the package.

Figure 2:
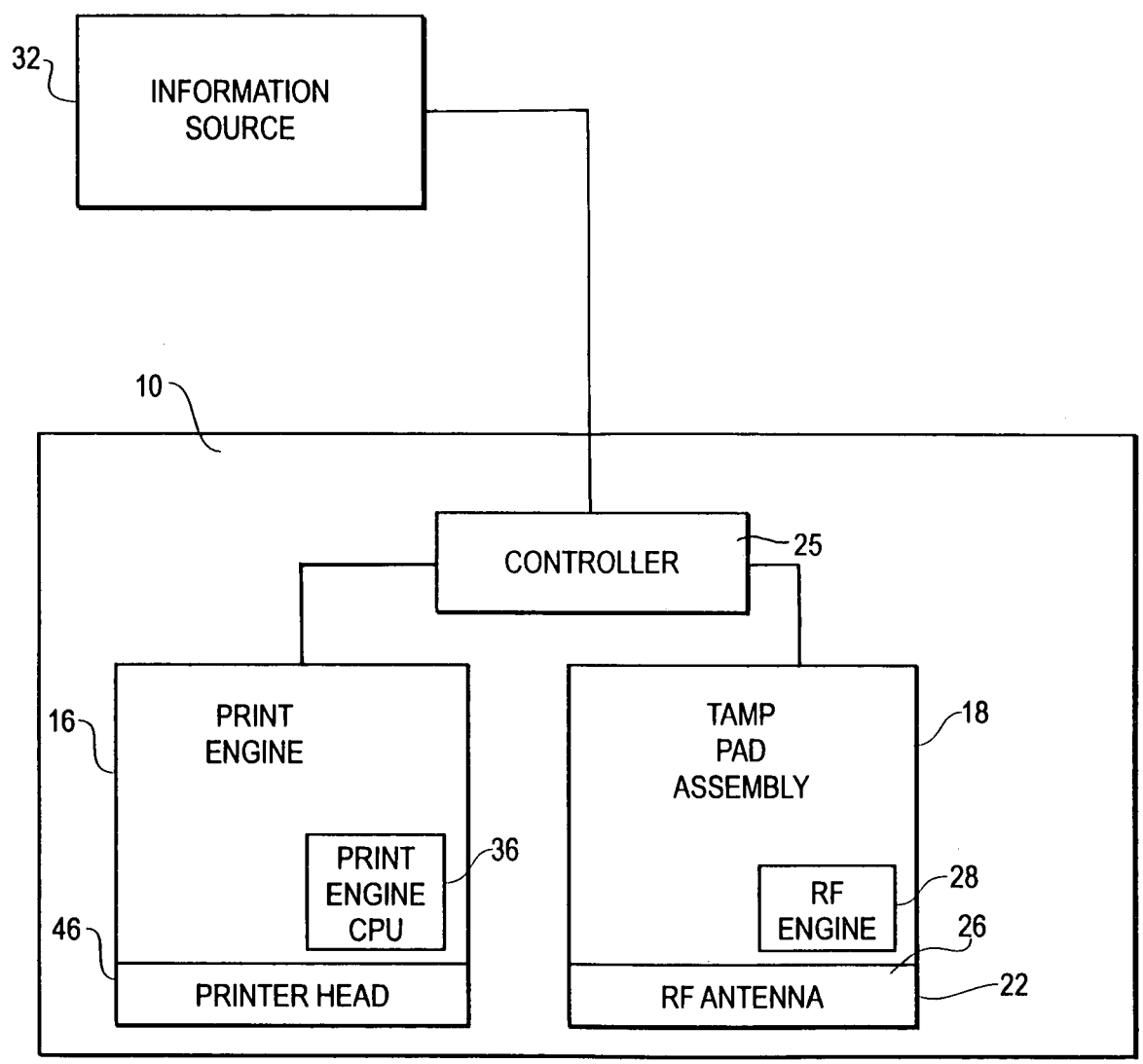
FIG. 2 is a schematic view of an information source in communication with one embodiment of the applicator machine of the invention.

In the preferred embodiment shown in FIGS. 1 and 2, the operation of the applicator machine 10 is controlled by a controller 25 mounted local to (or on) the machine 10. The controller 25 comprises a processing unit, preferably a circuit board, configured to receive, for example, the following types of information from the information source 32: RFID programming information, printing information, process triggers, timing and label feeding information. The information source 32, in one embodiment, is a user computer that a user utilizes to input the information the user desires the IC to be programmed with and the type of text and graphics the user desires to be printed on the label. Note that in other embodiments, instead of incorporating the desirable controller 25, the machine may receive the necessary information via direct serial links from the information source.

Figure 4:
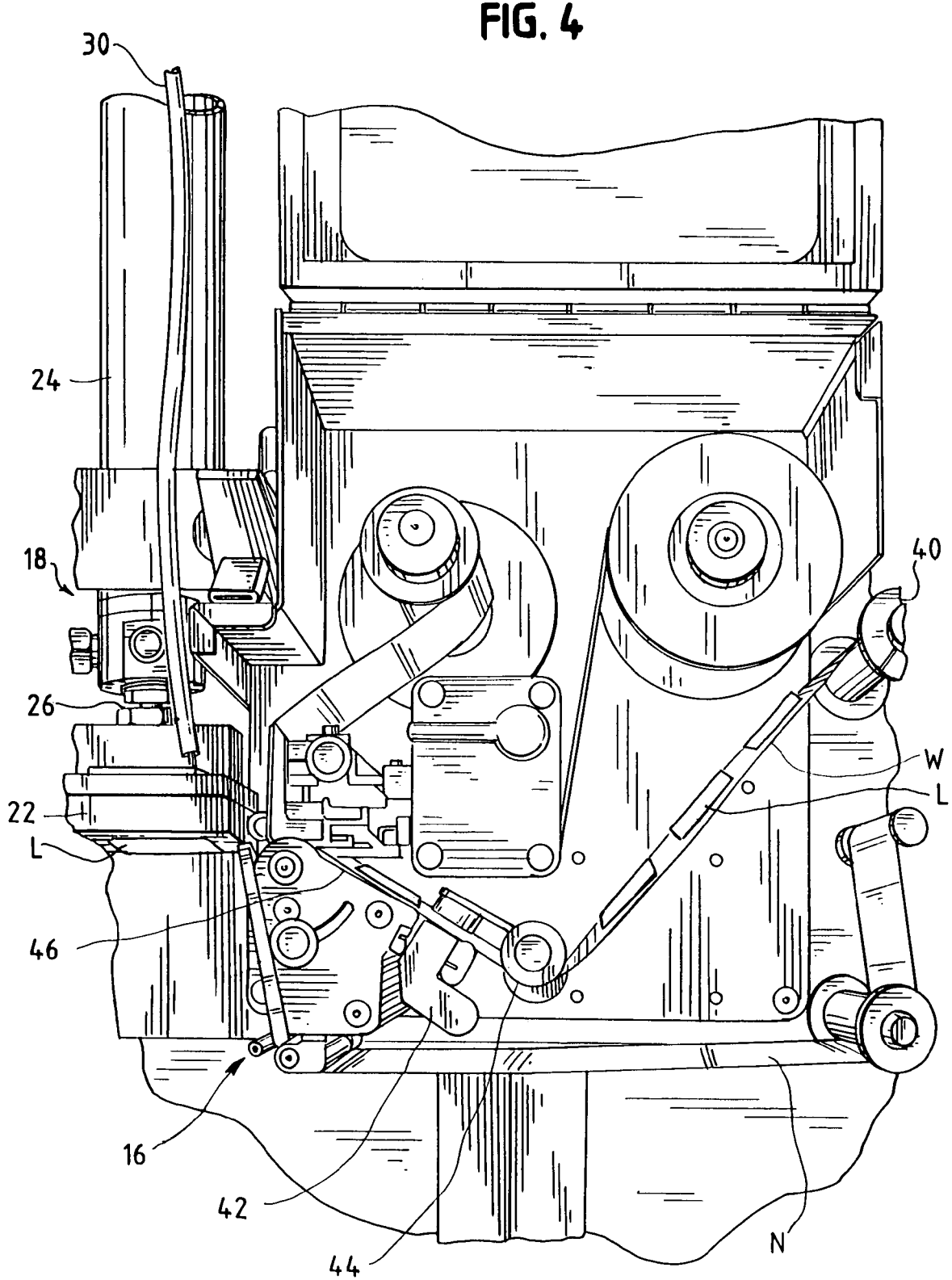
FIG. 4 is an illustration of the print head and shows the path of the web, labels and liner through the printer applicator.

Referring to FIGS. 1 and 4, and continuing through the machine 10, the web W traverses from the supply roll 14 over one or more guide rollers 40 and enters the print engine 16 in a non-programmed state, meaning that the RFID information that the user desires the IC to be programmed with is not yet programmed into the IC. As seen in FIG. 4, in the print engine 16, the web W is aligned by one or more guides 42 or rollers 44 and is traversed to the printer head 46. Indicia are printed on the RFID label L in accordance with information received at the print engine CPU 36 from the information source 32. Known methods and known printing techniques are used to print on to the RFID labels L. Because of the high volume of labels that must be printed and the advances made in printing technology, the printing operation is generally a fast one.

In one embodiment, indicia is imprinted on the RFID label L by transfer from a print ribbon by use of a thermal printer head 46 that is comprised of metal. Alternately, those skilled in the art will recognize the various types of contact and non-contact print devices that can be used. Those of skill in the art will also appreciate that other feeding and receiving assemblies and other print engine configurations that don't incorporate the supply roll, guide rollers or thermal printer head shown in the figures may be utilized with applicator machines of the invention.

Figure 3:
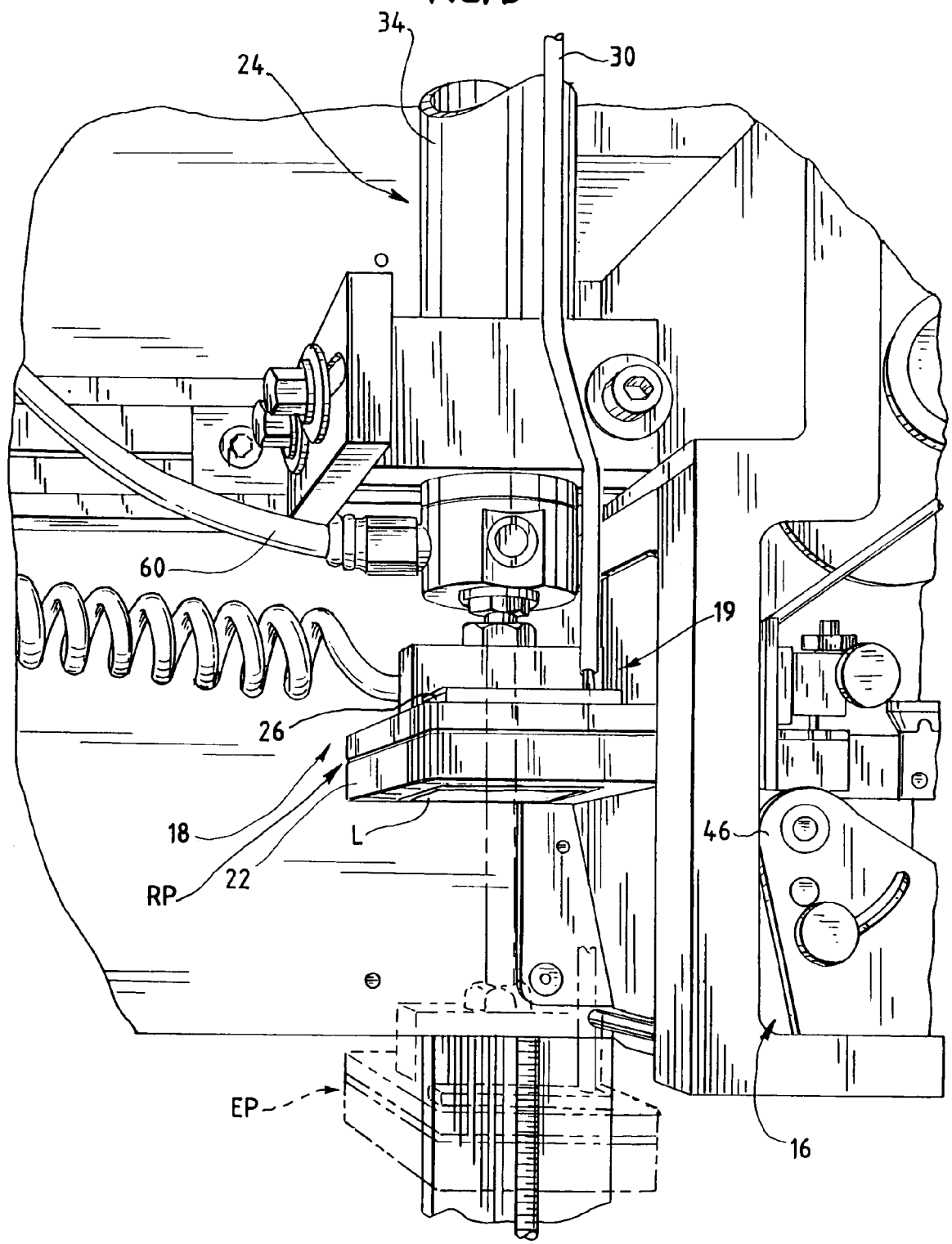
FIG. 3 is an enlarged illustration of one embodiment of the tamp assembly used in the printer applicator machine of the invention.

Referring to FIGS. 2 and 4, after exiting the print engine 16, the RFID label L is separated from the liner N of the web. The label L then traverses on to the tamp pad 22. FIGS. 1 and 3 show one embodiment of the tamp assembly 18, which includes the tamp pad 22 and tamp movement assembly 24. In the embodiment shown, the tamp movement assembly 24 comprises of a pneumatic cylinder 34. The tamp pad 22 (which will be discussed in detail below) is mounted to the cylinder 34 and moves with extension and retraction of the cylinder between the label applying or extended position (EP) and a label receiving or home position (RP) (FIG. 3). These positions are the positions at which the label L is applied to the package P surface and the position at which the label L is moved onto the tamp pad 22 after separation from the liner N.

Different tamp pad movement assemblies may be used to extend and retract the tamp pad, including the dual action cylinder assembly shown in the figures, as well as other electric and/or hydraulic powered movement assemblies not shown. In other embodiments, the tamp pad incorporates a swing arm to move in an angular or circular motion from the receiving position to the extended position, and in yet other embodiments, the tamp pad moves in both linear and circular motions while transitioning from the receiving to the extended position. The tamp assembly 18 is preferably in communication with the controller 25 to ensure proper extension and retraction of the tamp pad 22 and to receive instructions about the rate of label application.

Figure 5:
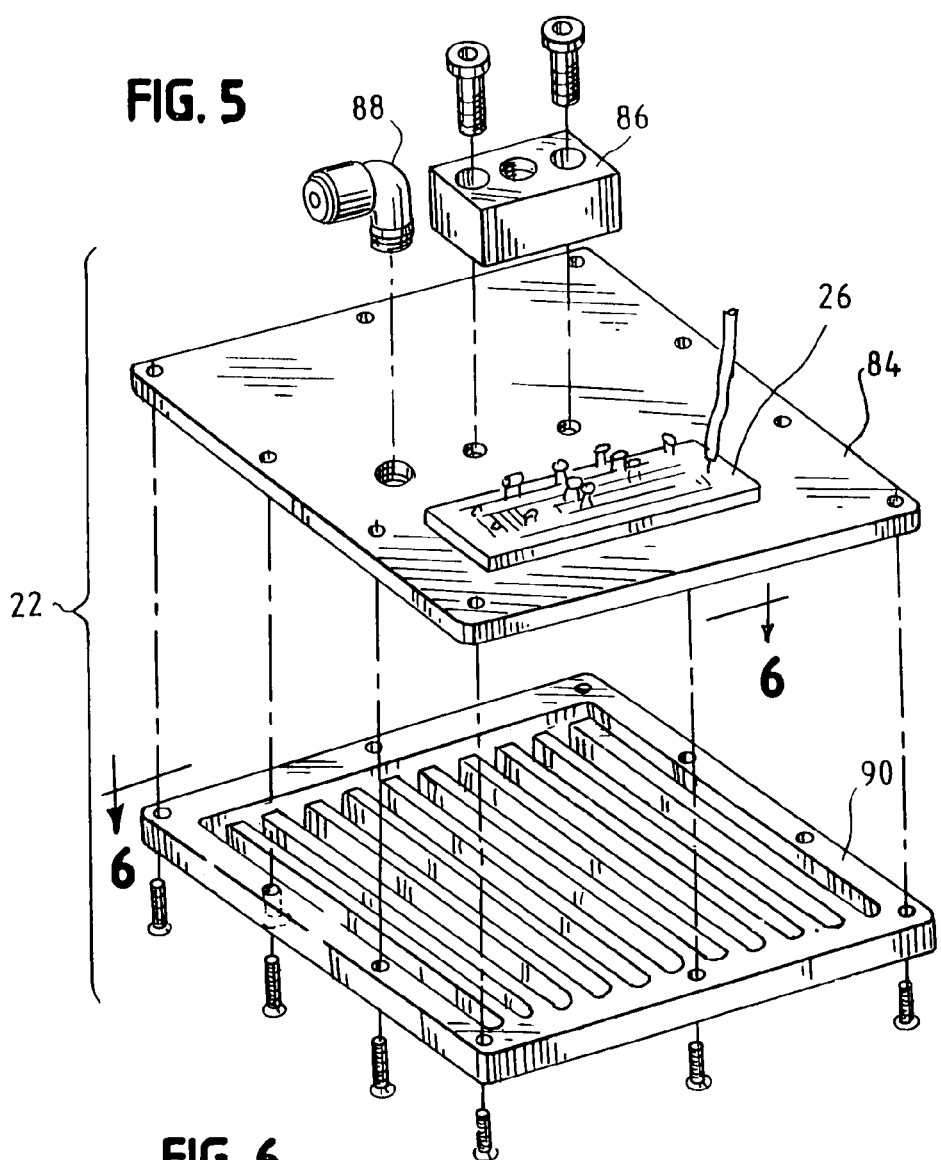
FIG. 5 is an exploded view of a tamp pad used in the tam assembly of FIG. 3; and, FIG. 6 is a front view of the tamp pad of FIG. 5 showing the vacuum openings.
Figure 6:
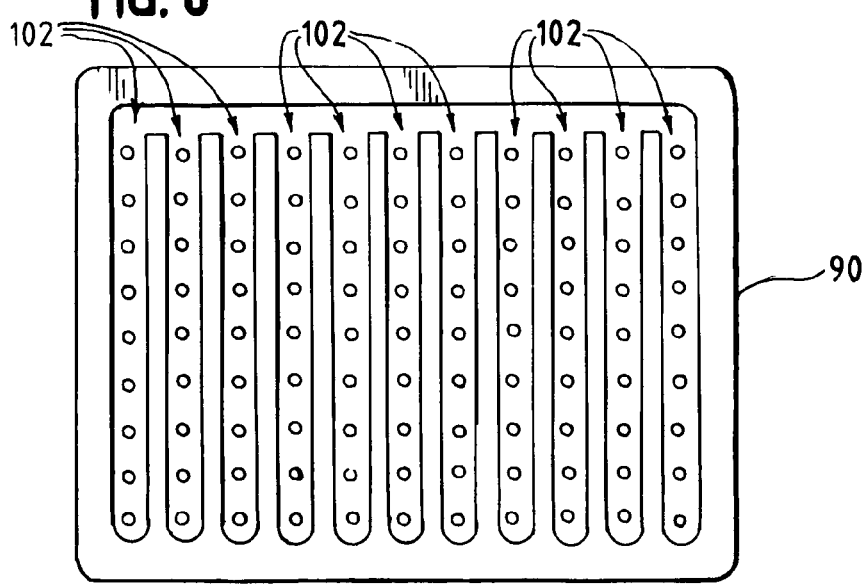

FIGS. 5–6 show a detailed view of the tamp pad 22 and the tamp pad attributes that allow it to secure the RFID label L after the label egresses the print engine 16. The tamp pad 22 includes a rear mounting plate 84 having a mounting block 86 attached thereto. A vacuum inlet 88, such as the illustrated vacuum elbow fitting is mounted to the rear mount plate 84. The tamp pad 22 is coupled to a suction source (not shown) by way of the inlet 88 and vacuum cables 60 (FIG. 1).

An impact plate 90 is mounted to the rear mounting plate 84. The impact plate 90 is that plate onto which the label L is transferred and is carried to the package surface for adhering to the package. Several sets of vacuum openings or through holes 102 are formed in the impact plate 90. It is through these openings 102 that vacuum is communicated to secure the non-adhesive side of the RFID label L to the tamp pad 22 from the time that it is separated from the liner N until it is applied to the package surface.

The process of receiving the label from the printer head 16 and applying the RFID label L to the package is typically much slower than the process of printing indicia onto the label. Embodiments of the invention take advantage of the slower application process by coupling the RF assembly 19 to the tamp assembly 18, thus providing the RF antenna 26 greater time to program the RFID label L. In particular, as shown in the embodiment of FIGS. 1 and 3, the RFID label L is secured to the tamp pad 22 by vacuum suction and, during that time, the RF antenna 26 sends RFID information signals to the label to program it. Preferably, as shown in the embodiments of FIGS. 1, 3 and 5, the RF antenna 26 of the RF assembly 19 is mounted to the mounting plate 84 of the tamp pad 22. Legacy systems, on the other hand, incorporate RF components in the print engine, resulting in ineffective RFID label programming caused by reduced time to program the RFID in the high speed printing operation.

In a preferred embodiment of the applicator machine 10, the mounting and impact plates 84, 90 are formed from a non-metallic material, such as Polytetrafluoroethylene (PTFE). Therefore, the signal blocking and degradation problems of the legacy applicator machines caused by RF antennas that are attached near metallic printer heads are obviated by coupling the RF antenna 26 near the non-metallic tamp pad 22. As a result, the RF antenna 26 of the invention sends RFID information signals that are unimpeded by metal, allowing for a stronger signal to reach and program the IC of the RFID label.

Further, as shown in FIG. 1, because the metallic printer head 16 is adjacent to the tamp assembly 18 of the invention, the printer head 16 serves as a shield from signals transmitted from the RF antenna that might propagate in an unintended direction. As a result, there is a diminished risk of mis-programming adjacent RFID labels from propagating signals, and signals with increased signal strength can be used, allowing for greater IC programming accuracy.

The RF antenna 26 is in communication with an RFID engine 28, preferably, as shown in FIG. 1, via an antenna cable 30. Because the tamp assembly 18 extends and retracts millions of times in a life span, the antenna cable 30 is under extreme stress from the constant flexing. As a result, it is desirable to use a highly flexible antenna cable, such as the RG188A/U cable manufactured by Diagraph Corp. The RG188A/U cable incorporates several fine tin plated wires, as opposed to rigid copper wiring used in most antenna cabling, allowing for greater flexibility and oxidation resistance.

The RFID engine 28 is in communication with the information source 32 and is configured to use RFID formatted data that is eventually utilized to program the RFID label L. In one embodiment, the RFID engine 28 comprises OEM RFID reader model number ALR-9932-A, which is manufactured by Alien Technology of Morgan Hill, Calif.

In the preferred embodiment shown in FIGS. 1–3, the RF engine 28 is in communication with the information source via the controller 25. The controller 25 formats raw information received from the information source 32 into an RFID format. The formatted RFID information is sent to the RF engine 28, which sends the information to the RF antenna 26.

In those applicator systems that incorporate a controller but are not configured to apply RFID labels, the controller also is not configured to format the data; but, the controller can be upgraded to format data into an RFID format. As a result, entities incorporating tamp assemblies that are not capable of programming and applying RFID labels may be upgraded without having to replace costly parts and without requiring additional serial ports or communication links at the information source. The RF assembly 19, comprising of the RFID engine 28, the RF antenna 26 and the antenna cable 30 may be coupled to the tamp assembly 18, and the upgraded controller 25 is used to send information in an RFID format to the RFID engine. The tamp assembly 18 will then be configured to apply RFID labels.

Note that, in other embodiments of the invention, an RF assembly 18 may be incorporated without the use of the controller 25, but such embodiments may require additional serial ports, communication links, firmware and software to send formatted data to the RF antenna. Such embodiments of the invention, however, are superior to legacy machines because the RF assembly 19 is coupled to the tamp assembly 18 and is therefore not encumbered by signal degradation caused by metallic printer heads; improved signal strength and programming accuracy results.

Legacy applicator machines do not incorporate a controller and have been modified to apply RFID labels; but, the results have been poor. Legacy machines require that additional software, hardware and serial communication links be added in order to format the RFID information created at the information source. Specifically, additional software must be added to the information source to format information into an RFID format and another serial communication link connecting the information source to the RFID engine must be added. Further, because the RF components are mounted in the print engine, the aforementioned signal degradation and low programming time problems persist.

In the embodiment of FIG. 1, the RF antenna 26 programs the RFID label L by transmitting RFID information signals to the RFID label. In a most preferred embodiment, the RF antenna 26 sends signals in one direction, as opposed to off the shelf antennas that propagate signals in a wide array of directions. The RF antenna 26 is preferably a monopole antenna and, in the embodiment shown in FIG. 1, transmits signals toward the RFID labels, downward and planar to the antenna. Diagraph antenna model no. 6145-430 is an example of such a monopole antenna.

After the RFID label L has been applied to the package, the machine must verify that the RFID label has been properly programmed. Legacy machines require another RF antenna positioned downstream along the conveyer belt C to verify proper RFID label programming. Additional equipment, which is costly and susceptible to malfunctioning, is therefore required.

The embodiment shown in FIGS. 1 and 3, on the other hand, verifies proper programming of the RFID label—without the need for an additional RF antenna placed downstream. In particular, when the tamp pad 22 is retracting to the RP position and the package P is moving along the conveyer belt C, the RF antenna 26 sends a test signal to the RFID label L secured to the package to confirm that the RFID label has been properly programmed. In the most preferred embodiment, a monopole antenna utilizing increased signal strength is used to compensate for the added distance between the RFID label L on the package and the RF antenna 26.

All patents referred to herein, are hereby incorporated herein by reference, whether or not specifically do so within the text of this disclosure.

In the present disclosure, the words "a" or "an" are to be taken to include both the singular and the plural. Conversely, any reference to plural items shall, where appropriate, include the singular.

From the foregoing it will be observed that numerous modifications and variations can be made to the invention without departing from the true spirit and scope of the novel concepts of the present invention. It is to be understood that no limitation with respect to the specific embodiments illustrated is intended or to be inferred. The disclosure is intended to cover all such modifications as fall within the scope of the invention, including, for example, machines that incorporate feeding and rewinding assemblies, print engines, tamp pad movement assemblies and tamp pad mechanisms to secure a label to the tamp pad that differ from those shown and described above.

What is claimed is:

1. A label applicator system for programming labels comprised of an integrated circuit and for applying the labels to an object, the system comprising:
    a tamp assembly including a tamp pad and a tamp pad movement assembly, the tamp pad coupled to the movement assembly, wherein the movement assembly moves the tamp pad from a receiving position to an extended position, the tamp pad receiving the label having the integrated circuit in the receiving position and applying the label to the object in the extended position, the tamp pad being formed from a non-metallic material; and,
    a radio frequency (RF) assembly coupled to the tamp assembly, the RF assembly including an RF identification (RFID) engine and an RF antenna, the RFID engine in communication with the RF antenna and an information source, wherein the RFID engine receives RFID information from the information source and sends the information to the RF antenna, the RF antenna sending RFID information signals to the label to program the label,
    whereby the non-metallic tamp pad material reduces signal degradation when the RF antenna send the signals to the label, over that of a metallic tamp pad.

2. The applicator system of claim 1, wherein the tamp pad further comprises Polytetrafluoroethylene (PTFE).

3. The applicator system of claim 1, wherein the RF antenna is mounted to the tamp pad.

4. The applicator system of claim 1, wherein the RF antenna further comprises a monopole antenna.

5. The applicator system of claim 1, further comprising a controller, wherein the RFID engine is in communication with the information source by way of the controller, the controller receiving information from the information source and being configured to format the information into an RFID format and send the formatted information to the RFID engine.

6. The applicator system of claim 1, wherein the RF antenna is in communication with the RF engine by way of a flexible cable.

7. The applicator system of claim 1, further comprising a print engine having a printer head, the printer head being comprised of a metallic material and being positioned adjacent to the tamp pad assembly so that, when the RF antenna sends signals, at least one of the signals is at least partially impeded from moving in a direction beyond the printer head.

8. The applicator system of claim 7, further comprising a feeding assembly and a rewinding assembly, both of which are coupled to the print engine.

9. The applicator system of claim 8, wherein the feeding assembly includes a supply roll that feeds the printer head with a web having a liner with at least one RFID label removably attached thereto, and the rewinding assembly includes a rewinding roll that rewinds the liner with the at least one RFID label removed.

10. The applicator assembly of claim 1, wherein the tamp pad movement assembly comprises a pneumatic cylinder, the cylinder being extended when the tamp pad is in the extended position and being retracted when the tamp pad is in the receiving position.

11. A method of programming labels having an integrated circuit and using an applicator system to apply the labels onto packages, the method comprising:
    providing a tamp pad on the applicator system, the tamp pad being formed having a non-metallic material surface;
    receiving a printed label having a non-programmed integrated circuit;
    sending information signals from an antenna to the integrated circuit to program the circuit, the antenna being mounted to the tamp pad; and,
    applying with the tamp pad the label having the integrated circuit onto the package, whereby the non metallic material surface reduces signal degradation caused by metallic surfaces during the step of sending information signals to the label.

12. The method of claim 11, further comprising sending from the antenna mounted on the tamp pad assembly a test signal to the label applied to the package, and determining whether the integrated circuit is properly programmed based on the test signal.

13. The method of claim 11, further comprising printing the label.

14. The method of claim 13, further comprising receiving information at the applicator system from an information source, the information including RFID information and printing information, wherein the printing step further comprises printing the label based on the printing information and the sending information signals step further comprises programming the RFID label by sending RFID information signals based on the RFID information.

15. The method of claim 14, further comprising formatting the information into an RFID format at a controller of the application system, and sending from the controller the formatted RFID information to an RFID engine and the printing information to a print engine, wherein the receiving information step further comprises receiving information at the controller of the applicator system.

16. A label applicator system for programming labels comprised of an integrated circuit and for applying the labels to a package, the system comprising:

receiving means for receiving a printed label having a non-programmed integrated circuit;

sending means for sending information signals to the integrated circuit to program the circuit, the sending means being mounted to a non-metallic applying means; and, the applying means for applying the label having the integrated circuit onto the package.

17. The label applicator system of claim 16, wherein the sending means sends test signals to the label after the label is applied to the package.

18. The label applicator system of claim 16, further comprising printing means for printing the labels and controller means for receiving information from an information source and for controlling the printing and sending means based on the information, the controller means being in communication with the printing and sending means.

* * * * *